United States Patent [19]

Reber et al.

[11] 4,030,274

[45] June 21, 1977

[54] AGRICULTURAL MACHINE

[75] Inventors: Erwin Reber; Fritz Schöllhorn, both of Saulgau, Germany

[73] Assignee: Josef Bautz GmbH, Saulgau, Wurttemberg, Germany

[22] Filed: Mar. 12, 1975

[21] Appl. No.: 557,668

[30] Foreign Application Priority Data

Mar. 15, 1974 Germany ............................ 2412461

[52] U.S. Cl. ................................... 56/13.5; 56/364
[51] Int. Cl.² ........................................ A01D 43/00
[58] Field of Search ...................................... 56/2–5, 56/14.1–14.6, 12.8, 13.4, 344, 364, 13.5

[56] References Cited

UNITED STATES PATENTS

| 2,763,115 | 9/1956 | Skromme | 56/13.5 |
| 3,100,370 | 8/1963 | Blanshine | 56/13.9 |
| 3,425,194 | 2/1969 | Stott et al. | 56/2 X |
| 3,540,199 | 11/1970 | Lenzer et al. | 56/364 |
| 3,665,688 | 5/1972 | Sheehan et al. | 56/14.6 |

FOREIGN PATENTS OR APPLICATIONS

| 2,305,380 | 9/1973 | Germany | 56/13.4 |

*Primary Examiner*—Russell R. Kinsey
*Attorney, Agent, or Firm*—Michael J. Striker

[57] ABSTRACT

An agricultural machine for picking up and chopping stalks and like materials has an intake unit for materials to be chopped which includes a first housing and a material pick-up device, a chopping unit for chopping the picked-up material which includes a second housing and a chopping device mounted therein, and a quick-release coupling arrangement which connects the housings with one another.

8 Claims, 3 Drawing Figures

AGRICULTURAL MACHINE

BACKGROUND OF THE INVENTION

The present invention relates in general to an agricultural machine, and more particularly to an agricultural machine for picking up and chopping stalks and like materials, such as chaff.

Equipment of this type is used to pick up chaff, stalks and the like and to chop them to small lengths. It is known from the prior art to provide a machine of this type in which a housing accommodates the knives. If these knives must be changed for sharp ones, or if access must be had to the knives because material is caught in them, the housing is pivoted about a horizontal axis in order to obtain access to the knives. However, the opening which is thus made available is not adequate and makes it very difficult to gain access to the knives, making it not only difficult to inspect or replace the knives but also making it difficult to adjust the knives with reference to one another, that is the knives and the counter knives which cooperate.

SUMMARY OF THE INVENTION

It is, accordingly, a general object of this invention to overcome the disadvantages of the prior art.

More particularly, it is an object of this invention to provide an improved agricultural machine of the type in question which avoids the aforementioned disadvantages but does not require any complicated structure to achieve this purpose.

Still more particularly, it is an object of the invention to provide such a machine in which unhindered access is available to all internal components of the pick-up unit and of the chopping unit.

In keeping with these objects, and with others which will become apparent hereafter, one feature of the invention resides, in an agricultural machine for picking up and chopping stalks and like materials, in a combination which comprises an intake unit for materials to be chopped, having a first housing and material pick-up means on the first housing, a chopping unit for chopping the picked-up material and having a second housing and chopping means mounted therein, and quick-release coupling means connecting the housings with one another.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
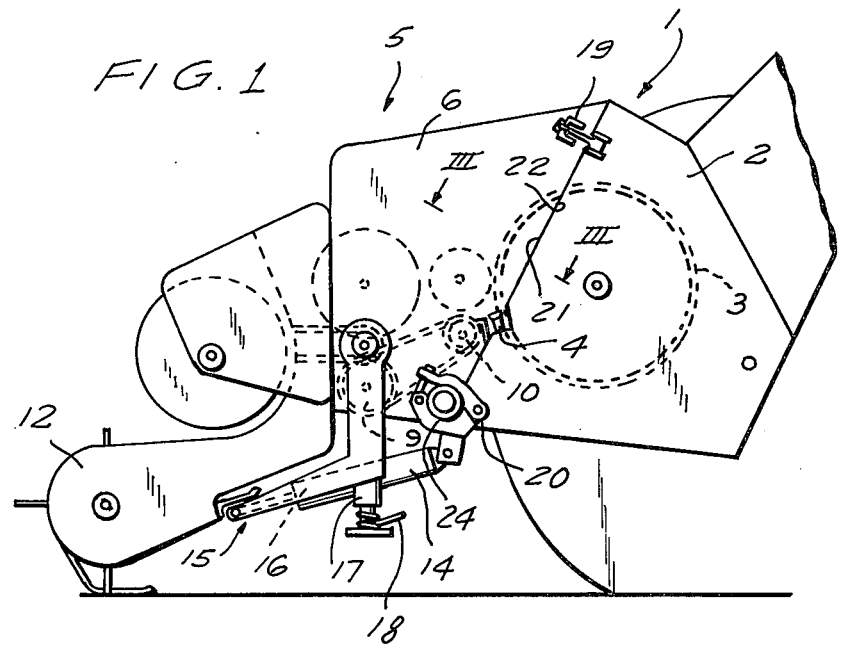
FIG. 1 is a somewhat diagrammatic side view of an agricultural machine embodying the present invention, in operating position.
Figure 3:
FIG. 3 is a fragmentary section on line III—III of FIG. 1.
Figure 2:
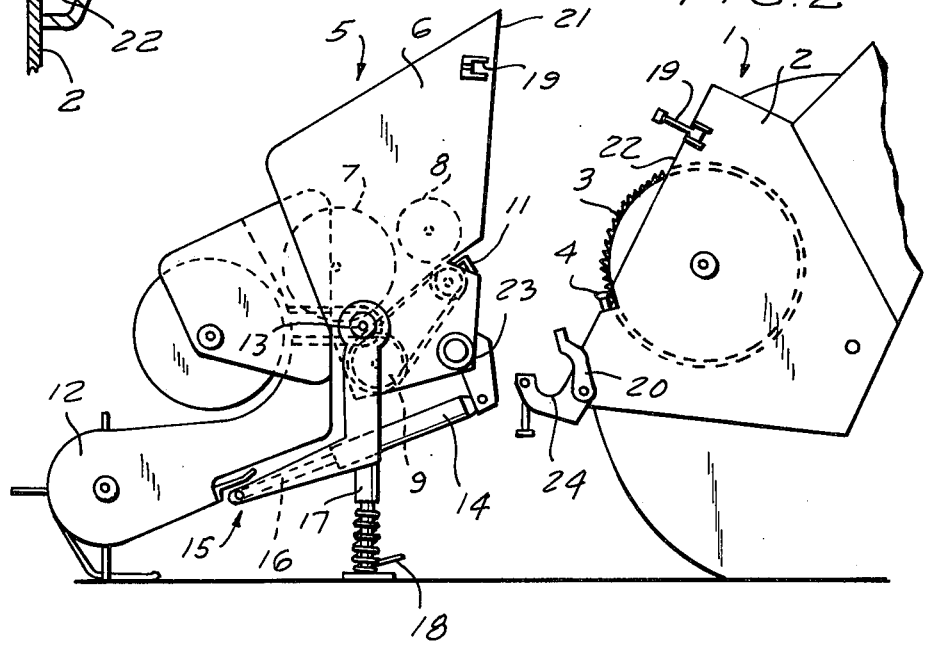
FIG. 2 shows the machine of FIG. 1 in a position in which the housings of the units are disconnected from one another.

FIGS. 1-3 illustrate an exemplary embodiment of the invention. It should be understood that the invention can be used to advantage in a self-propelled agricultural chopper, as well as in the type of chopper which is pulled by a tractor or the like. This being the case, no attempt has been made in the drawing to illustrate any propulsion means; only those components have been shown and will be described which are necessary for an understanding of the invention. The propulsion means, whether the machine is of the self-propelled or of the pulled or pushed type, is obvious to those having ordinary skill in the art.

The machine in FIGS. 1-3 has a chopping unit 1 with a housing 2 in which rotary cutter means 3 that coacts with stationary cutter bar 4 are disposed and which also includes a discharge duct. At the front of the chopping unit 1 is a pickup and conveying unit 5 having a housing 6 in which there are arranged feeding instrumentalities, i.e., upper feed rolls 7, 8, conveyor belt driving rolls 9, 10 and strip ledge 11. Mounted at the front side of the housing 6 is a pick-up device 12 which can be selectively replaced with another one, depending upon the type of material to be picked up, (e.g. corn stalks or the like). The device 12 picks up the material to be chopped, and it is mounted on the housing 6 for pivotal movement about a horizontal axis 13. The device 12 can be adjusted in a vertical direction by pivoting it about the axis 13, and this adjustment is effected via a device 14, for example a cylinder and piston unit, which can be varied as to its length and which engages with one of its ends the housing 6 and with its other end the free end portion 15 of an arm 16 which is mounted for pivotal movement in a vertical plane about the pivot axis 13 on the housing 6.

The arm 16 is also provided with a supporting element or foot 17 whose length can be varied by operation of an adjusting device 18, for example a threaded spindle, and which can be moved upwardly away from the ground to a rest position when the machine is to be used.

The housing 6 is releasably connected with the housing 2 by means of a quick-release coupling device 19, 20, 23 and 24. The device 19, 20 may utilize the illustrated tension brackets. The housings 2 and 6 are provided at their normally juxtaposed sides with edge guide portions 21, 22 and 23, 24 which can interengage with one another (compare FIG. 3) in order to center the two housings 2 and 6 with reference to one another and to provide for a reliable and firm connection between them.

The normal operating condition of the machine is shown in FIG. 1. In order to convert it to the condition shown in FIG. 2, in which access may be had to the components located in the interiors of the housings 2 and 6, the supporting element 17 is first moved to a ground-engaging position. Thereupon, the quick-release coupling arrangement 19, 20 is disengaged and the housing 6 is pivoted upwardly, by operation of the drive 14 and about the axis 13, to the extent to which the guide portions 23 and 24 were interengaged with one another. Once these guide portions have become disengaged from one another, the unit 1 is withdrawn (to the right in FIG. 2) from the housing 6, leaving the open sides of the housings 2 and 6 fully exposed for access to the components located in the interiors of the respective housings. To reconnect the two housings 2 and 6 with one another, the above operations are carried out in a reverse order.

It is conceivable to disconnect the housing 6 from the device 12 when the housings 2 and 6 are disconnected from one another. However, it is preferred that the housing 6 remain connected to the device 12, when disconnected from the housing 2, so that subsequently a reconnection of the housings 2 and 6 via the coupling device 19, 20 rapidly result in reassembly of the machine and readiness thereof for further operations.

The provision of the arm 16 and the device 14 which acts upon the same, assures a particularly simple and quick disengagement of the housing 6 from the housing 2, and their reengagement, repairs and inspections can be carried out quickly and machine down-time is reduced to a minimum.

It will be understood that each of the elements described above, or two or more together, may also find a useful application in other types of constructions differing from the types described above.

While the invention has been illustrated and described as embodied in an agricultural material for chopping of stalks and the like, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In an agricultural machine for picking up and chopping stalks and other materials, a combination comprising a first unit including a first housing having a leading end portion and a trailing end portion provided with a rearwardly facing open end, material pick-up means, and conveyor means in said first housing for receiving material from said pick-up means and conveying it to said open end; a second unit including a crop-receiving second housing having an open front end facing said open end of said first unit so as to receive the fed material therethrough, a rotary cutter head and a cooperating stationary cutter bar in said second housing for chopping the material entering from said first housing; and quick-release coupling means for removably connecting said units to one another with said open ends in mutually facing relationship so that, upon disengagement of said units from one another, the components located in the interiors of said housing become accessible through the respective open ends thereof.

2. A combination as defined in claim 1, wherein said first housing comprises at least one ground-engaging support, and means for varying the length and orientation of said support.

3. A combination as defined in claim 1, wherein said first housing comprises an arm mounted for pivotal displacement about a horizontal axis on the first housing, and at least one ground-engaging support mounted on said arm and being variable in its length, said arm having a free end portion contacting said pick-up means and swingable in a vertical plane by an adjusting means connected to said first housing and said free end portion and operative for effecting relative pivotal movement of said pick-up means and first housing.

4. A combination as defined in claim 1, wherein said pick-up means is mounted on said first housing and remains connected thereto upon disconnecting of said housings via said quick-release coupling means.

5. A combination as defined in claim 3, wherein said adjusting means comprises an adjustable structure which pivots said pick-up means to and from pick-up positions relative to said first housing when said housings are connected with one another, and which pivots said first housing relative to said second housing and pick-up means when said housings are disconnected from one another.

6. A combination as defined in claim 1, further comprising mating engaging portions on said open sides and adapted to matingly interengage and center said housings with reference to one another.

7. A combination as defined in claim 3, wherein said arm is a bell-crank lever.

8. A combination as defined in claim 7, wherein said ground-engaging support is mounted in the region of a knee of said bell-crank lever.

* * * * *